(12) United States Patent
Peterson et al.

(10) Patent No.: US 12,069,022 B2
(45) Date of Patent: Aug. 20, 2024

(54) INTERNET PROTOCOL MESSAGES VIA SHORT MESSAGE SERVICE

(71) Applicant: Motorola Mobility LLC, Chicago, IL (US)

(72) Inventors: Nathan Peterson, Oxford, NC (US); Gary D Cudak, Raleigh, NC (US); John M Petersen, Wake Forest, NC (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/701,896

(22) Filed: Mar. 23, 2022

(65) Prior Publication Data

US 2023/0308412 A1    Sep. 28, 2023

(51) Int. Cl.
*H04L 51/58* (2022.01)
*H04L 67/02* (2022.01)
*H04W 4/14* (2009.01)

(52) U.S. Cl.
CPC .............. *H04L 51/58* (2022.05); *H04L 67/02* (2013.01); *H04W 4/14* (2013.01)

(58) Field of Classification Search
CPC ......... H04L 51/58; H04L 67/02; H04L 51/04; H04L 51/066; H04L 51/214; H04L 51/56; H04L 51/18; H04L 51/234; H04L 51/48; H04L 51/52; H04L 67/04; H04L 67/303; H04L 67/306; H04L 69/18; H04L 12/1859; H04L 51/043; H04L 51/046; H04L 51/08; H04L 51/224; H04L 51/23; H04L 63/0236; H04L 63/083; H04L 65/1101; H04L 65/80; H04L 67/06; H04L 67/289; H04L 67/55; H04L 67/564; H04L 67/565; H04L 67/5681; H04L 69/16; H04L 69/168; H04L 9/40; H04W 4/14; H04W 4/12; H04W 4/48; H04W 8/18; H04W 88/02; H04W 12/06; H04W 12/068; H04W 12/069; H04W 12/08; H04W 12/72; H04W 4/00; H04W 4/02; H04W 4/021; H04W 4/024; H04W 4/027; H04W 4/029; H04W 4/16; H04W 4/18; H04W 4/20; H04W 4/24; H04W 4/70; H04W 48/02; H04W 48/04;
(Continued)

(56) References Cited

U.S. PATENT DOCUMENTS 7,069,301 B2 * 6/2006 Jerbi ................. H04L 51/066
709/206
8,290,521 B1 * 10/2012 Lan .................... H04W 4/14
455/412.2
(Continued)

OTHER PUBLICATIONS

"Dispatch API Overview", Vonage Developer [retrieved Feb. 17, 2022]. Retrieved from the Internet <https://developer.vonage.com/dispatch/overview>., 17 Pages.
(Continued)

*Primary Examiner* — Greg C Bengzon
(74) *Attorney, Agent, or Firm* — FIG. 1 Patents (57) ABSTRACT

Techniques for internet protocol (IP) messages via short message service (SMS) are described and may be implemented via a wireless device to enable messages originated via an IP technique (e.g., an IP application) to be converted to SMS messages when a condition occurs that prevents sending and/or receiving an IP message.

20 Claims, 8 Drawing Sheets

(58) Field of Classification Search
CPC ........... H04W 52/0251; H04W 64/006; H04W 68/00; H04W 76/10; H04W 8/26; H04W 84/042; H04W 88/10; H04M 1/72436; H04M 1/72463; H04M 3/42382; H04M 1/6091; H04M 1/663; H04M 1/667; H04M 1/72412; H04M 1/7243; H04M 1/72439; H04M 1/72454; H04M 15/00; H04M 15/04; H04M 15/06; H04M 15/28; H04M 15/41; H04M 15/62; H04M 15/88; H04M 2215/0116; H04M 2250/22; H04M 3/2218; H04M 3/2281; H04M 3/387; H04M 3/42374; H04M 3/436; H04N 1/00209; H04N 1/00212; H04N 1/0022
See application file for complete search history.

(56) References Cited

U.S. PATENT DOCUMENTS

| | | | | |
|---|---|---|---|---|
| 8,391,136 | B1* | 3/2013 | Eidelson | H04L 51/23 370/228 |
| 9,246,854 | B2* | 1/2016 | Tanaka | H04L 51/04 |
| 9,740,740 | B1* | 8/2017 | Jett | G06F 1/163 |
| 10,193,846 | B2* | 1/2019 | Badulescu | H04L 51/043 |
| 2005/0136897 | A1* | 6/2005 | Praveenkumar | H04L 65/80 455/414.1 |
| 2007/0238449 | A1* | 10/2007 | Park | H04M 1/663 455/417 |
| 2008/0025343 | A1* | 1/2008 | Rangel | H04L 67/04 370/469 |
| 2008/0232248 | A1* | 9/2008 | Barave | H04L 51/214 370/230 |
| 2008/0261590 | A1* | 10/2008 | Tso | H04W 4/12 455/432.2 |
| 2009/0016499 | A1* | 1/2009 | Hullfish | H04L 51/04 379/93.01 |
| 2012/0149404 | A1* | 6/2012 | Beattie, Jr. | H04W 4/12 455/507 |
| 2012/0172012 | A1* | 7/2012 | Sumcad | H04W 4/48 455/414.1 |
| 2013/0227033 | A1* | 8/2013 | Tanaka | H04L 51/48 709/206 |
| 2013/0260802 | A1* | 10/2013 | Mayblum | H04W 4/12 709/206 |
| 2013/0316746 | A1* | 11/2013 | Miller | H04L 51/23 455/466 |
| 2014/0025756 | A1* | 1/2014 | Kamens | H04L 51/04 709/206 |
| 2014/0082103 | A1* | 3/2014 | Baxter, Jr. | H04L 51/56 709/206 |
| 2015/0142897 | A1* | 5/2015 | Alten | H04L 51/56 709/206 |
| 2016/0087924 | A1* | 3/2016 | Ramalingam | H04L 51/04 709/206 |
| 2016/0353258 | A1* | 12/2016 | Stuntebeck | H04L 51/18 |
| 2017/0150332 | A1* | 5/2017 | Palanisamy | H04W 4/70 |
| 2017/0155612 | A1* | 6/2017 | Badulescu | H04L 51/043 |
| 2018/0176362 | A1* | 6/2018 | Cohen | G08B 25/016 |
| 2018/0367965 | A1* | 12/2018 | Palanisamy | H04W 4/70 |
| 2020/0327199 | A1* | 10/2020 | Iyer | G06F 40/58 |
| 2020/0327275 | A1* | 10/2020 | McGinnis | G06F 40/205 |
| 2021/0014182 | A1* | 1/2021 | Stafford | H04W 8/26 |
| 2022/0360550 | A1* | 11/2022 | Gupta | H04L 51/066 |
| 2023/0132238 | A1* | 4/2023 | Menon | H04M 3/533 455/413 |
| 2023/0412543 | A1* | 12/2023 | Lapic | H04L 51/56 |

OTHER PUBLICATIONS

"MessageHybrid", Smsmode [retrieved Feb. 18, 2022]. Retrieved from the Internet <https://www.smsmode.com/en/solutions-sms/messagehybrid-messagerie-mobile-pro/>., 9 Pages.

"Permissions and APIs that Access Sensitive Information", Google [retrieved Feb. 17, 2022]. Retrieved from the Internet <https://support.google.com/googleplay/android-developer/answer/9888170>., 5 Pages.

"Reading network state", Google Developers [retrieved Feb. 17, 2022]. Retrieved from the Internet <https://developer.android.com/training/basics/network-ops/reading-network-state>., 13 Pages.

"Request SMS Verification in an Android App", Google Developers [retrieved Feb. 17, 2022]. Retrieved from the Internet <https://developers.google.com/identity/sms-retriever/request>., 7 Pages.

"SmsManager", Google Developers [retrieved Feb. 17, 2022]. Retrieved <https://developer.android.com/reference/android/telephony/SmsManager#sendTextMessage(java.lang.String,%20java.lang.String,%20java.lang.String,%20android.app.PendingIntent,%20android.app.PendingIntent)>, 91 Pages.

Mazzina, Alyssa , "The Right Messaging Strategy: The Easy Way to Reach More Customers", Vonage [retrieved Feb. 17, 2022]. Retrieved from the Internet <https://www.vonage.cl/resources/articles/right-messaging-strategy-way-reach-more-customers/>., 5 Pages.

* cited by examiner

INTERNET PROTOCOL MESSAGES VIA SHORT MESSAGE SERVICE

BACKGROUND

Wireless communication is ubiquitous and is used for a multitude of purposes, including wireless voice and data communication. Further, wireless protocols are constantly evolving to provide increased service levels for wireless users. Accordingly, a variety of different radio access technologies (RAT) are available for implementing wireless communication, including 3G, 4G Long Term Evolution (LTE), 5G (e.g., 5G New Radio (NR)), WiFi, and so forth.

BRIEF DESCRIPTION OF THE DRAWINGS

Aspects of internet protocol (IP) messages via short message service (SMS) are described with reference to the following Figures. The same numbers may be used throughout to reference similar features and components that are shown in the Figures.

DETAILED DESCRIPTION

Techniques for IP messages via SMS are described and may be implemented via a wireless device to enable messages originated via an IP technique (e.g., an IP application) to be converted to SMS messages when a condition occurs that prevents sending and/or receiving an IP message.

For instance, consider a scenario where a user of a first wireless device (e.g., a smartphone) interacts with the first wireless device to initiate sending an IP message to a second wireless device. The user, for instance, generates an IP message by interacting with an IP application on the first wireless device. A condition occurs, however, that prevents sending and/or receiving the IP message. For example, data connectivity at the first wireless device is insufficient to enable sending the IP message, such as based on poor signal quality and/or poor signal strength at the wireless device. Additionally or alternatively, data connectivity at the second wireless device is insufficient to enable the second wireless device to receive the IP message. For instance, when the first wireless device attempts to send the IP message to the second wireless device, the first wireless device receives an error message indicating that the IP message attempt to the second wireless device fails.

Accordingly, based on the condition preventing sending and/or receiving the IP message, techniques for IP messages via SMS described herein can be implemented to generate an SMS message based on the IP message. For instance, content from the IP message is extracted and populated to an SMS message. Further, the SMS message is identified as being associated with a particular IP application used to generate the IP message. Thus, the SMS message can be sent from the first wireless device to the second wireless device and utilized at the second wireless device to reconstruct an IP message from the SMS message. For example, the second wireless device determines based on an attribute of the SMS message (e.g., a header) that the SMS message is associated with a particular IP application. Thus, content from the SMS message can be extracted and populated to an IP message for the IP application. The IP message, for instance, is generated by the IP application using its native message format (e.g., visual appearance) and is populated with content from the SMS message.

The IP message can be output on the second wireless device based on an output modality of the IP application. In at least some implementations the conversion of IP messages to SMS messages and SMS messages to IP messages occurs via background processes that occur automatically and without user notification that the processes are occurring. Thus, a user experience with IP messaging can be preserved by mitigating interruptions with IP application services.

While features and concepts discussed herein can be implemented in any number of different devices, systems, environments, and/or configurations, aspects of the described implementations are described in the context of the following example devices, systems, and methods.

Figure 1:
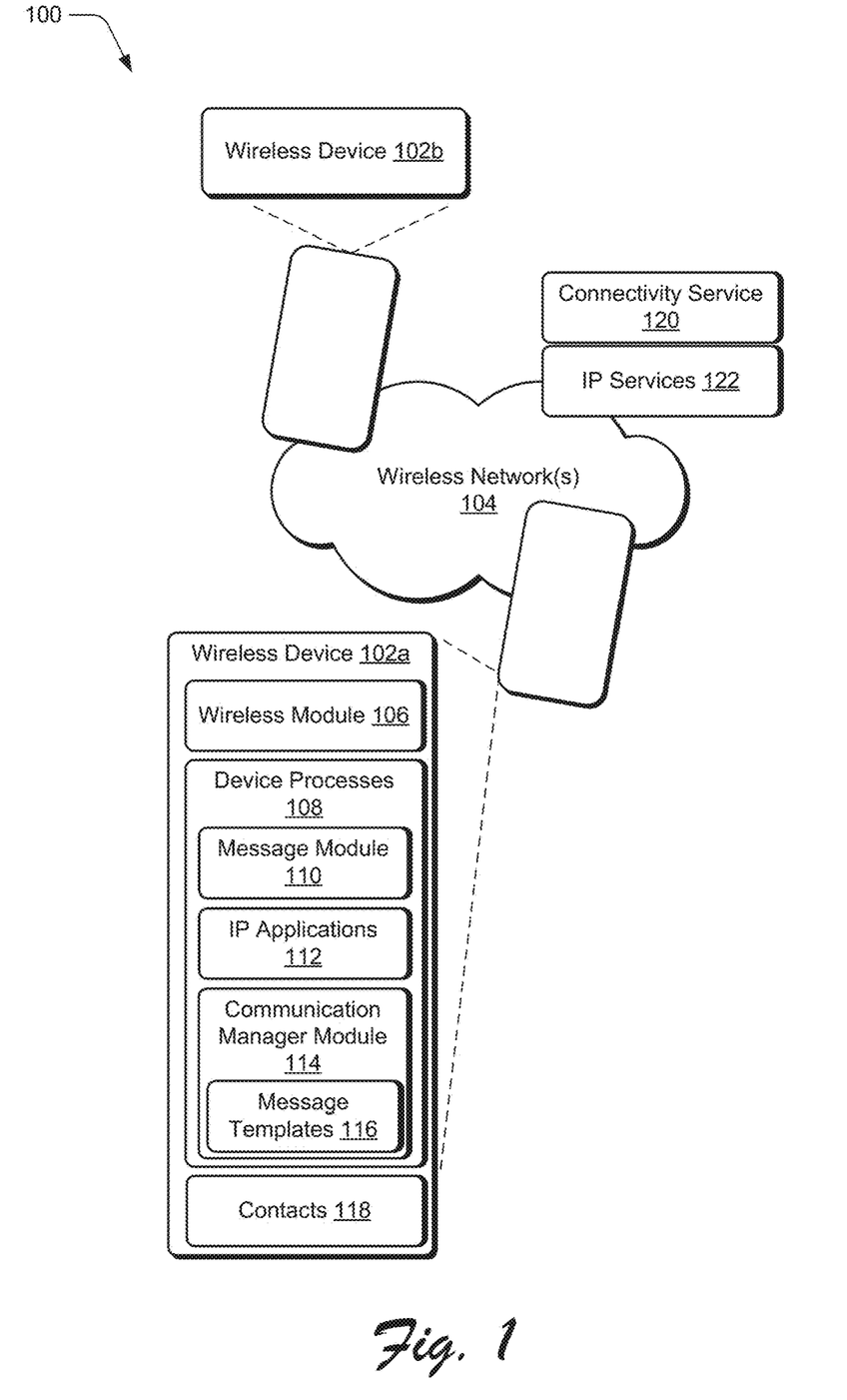
FIG. 1 illustrates an example environment in which aspects of IP messages via SMS can be implemented.

FIG. 1 illustrates an example environment 100 in which aspects of IP messages via SMS can be implemented. The example environment 100 includes a wireless computing device ("wireless device") 102a that is connectable to a wireless network 104. In this example the wireless device 102a represents a portable device that can be carried by a user, such as a smartphone, a tablet device, a laptop, a wearable computing device, (e.g., a smartwatch or a fitness tracker), and so forth. These examples are not to be construed as limiting, however, and the wireless device 102a can be implemented in a variety of different ways and form factors and in at least one implementation can be implemented as an internet of things (IoT) device. Further example attributes of the wireless device 102a are discussed below with reference to the device 700 of FIG. 7.

The wireless device 102a includes various functionality that enables the wireless device 102a to perform different aspects of IP messages via SMS discussed herein, including a wireless module 106 and device processes 108. The wireless module 106 represents functionality (e.g., hardware and logic) that enables the wireless device 102a to communicate wirelessly, such as for wireless data and voice communication. The wireless module 106, for instance, includes functionality to support different wireless protocols, such as wireless cellular (e.g., 2G, 3G, 4G, 5G, etc.), wireless broadband, Wireless Local Area Network (WLAN) (e.g., Wi-Fi), Wi-Fi Direct, wireless short distance communication (e.g., Bluetooth™ (including Bluetooth™ Low Energy (BLE), ultra-wideband (UWB)), Near Field Communication (NFC)), New Radio (NR) sidelink, and so forth. The wireless module 106 includes various components such as antennas, a transceiver, a modem, an analog-to-digital converter (ADC), a digital-to-analog converter (DAC), a mixer, and so forth.

The device processes 108 are representative of logic that is executable by the wireless device 102a to perform various tasks, examples of which include applications, system processes, an operating system, and so forth. The device processes 108 include a message module 110, IP applications 112, and a communication manager module 114. The message module 110 represents functionality for enabling the wireless device 102a to send and receive messages such as text messages. In at least one implementation the message module 110 represents functionality for short message service (SMS). The IP applications 112 represent functionality for enabling IP-based data communication for the wireless device 102a. The IP applications 112, for instance, can enable communication between different users such as voice, text, video, email, and content communication. Additionally or alternatively the IP applications 112 can include applications that exchange data for various purposes such as for gaming, productivity tasks, enterprise tasks, and so forth.

The communication manager module 114 represents functionality for implementing various aspects of IP messages via SMS described herein. The communication manager module 114, for instance, can enable messages that are unable to be sent via an IP application 112 to be formatted and sent via the message module 110. Further, the communication manager module 114 can enable messages that are received via the message module 110 to be recognized as being directed to a particular IP application 112 and thus routed to the IP application 112.

The communication manager module 114 maintains and/or has access to message templates 116 that the communication manager module 114 can utilize to convert IP messages to SMS messages and SMS messages to IP messages. For instance, different instances of the IP applications 112 are associated with respective instances of the message templates 116. Thus, when an IP message associated with a particular IP application 112 is to be converted to an SMS message, a particular message template 116 associated with the particular IP application 112 is selected and utilized to convert the IP message to an SMS message. The message templates 116, for example, are generated based on particular data formats and/or encoding schemes utilized by respective IP applications 112 such that when an SMS message is generated based on an IP message for a particular IP application 112, the SMS message can be decoded by the particular IP application 112 and/or content can be extracted from the SMS message in a form that can be understood by the particular IP application 112.

The wireless device 102a also maintains and/or has access to contacts 118 which represent identifiers and addresses (e.g., phone numbers, emails, aliases, etc.) for persons (e.g., other users) that can be contacted via the wireless device 102a. In at least one implementation, as part of the techniques described herein, information from the contacts 118 can be utilized as part of converting IP messages to SMS messages and vice-versa.

The environment 100 further includes a wireless device 102b which represents a device that is able to communicate wirelessly with the wireless device 102a over the wireless network 104 and/or via direct wireless communication. In at least one implementation, the wireless device 102b represents a different instance of the wireless device 102a, e.g., instances of the functionality discussed with reference to the wireless device 102a also reside on the wireless device 102b. Further example features of the wireless devices 102a, 102b are discussed below with reference to the device 700 of FIG. 7.

The environment 100 also includes a connectivity service 120 and IP services 122. The connectivity service 120, for instance, provides connectivity via packet switched and circuit switched connectivity. In at least one implementation, the connectivity service 120 implements different RATs according to the 3rd Generation Partnership Project (3GPP) protocols such as via an IP Multimedia Subsystem (IMS) architecture. The IP services 122 represent services that manage various aspects of the IP applications 112. For instance, the IP services 122 can implement aspects of IP messages via SMS described herein, such as to assist in conversion of IP messages to SMS messages and SMS messages to IP messages.

Figure 2:
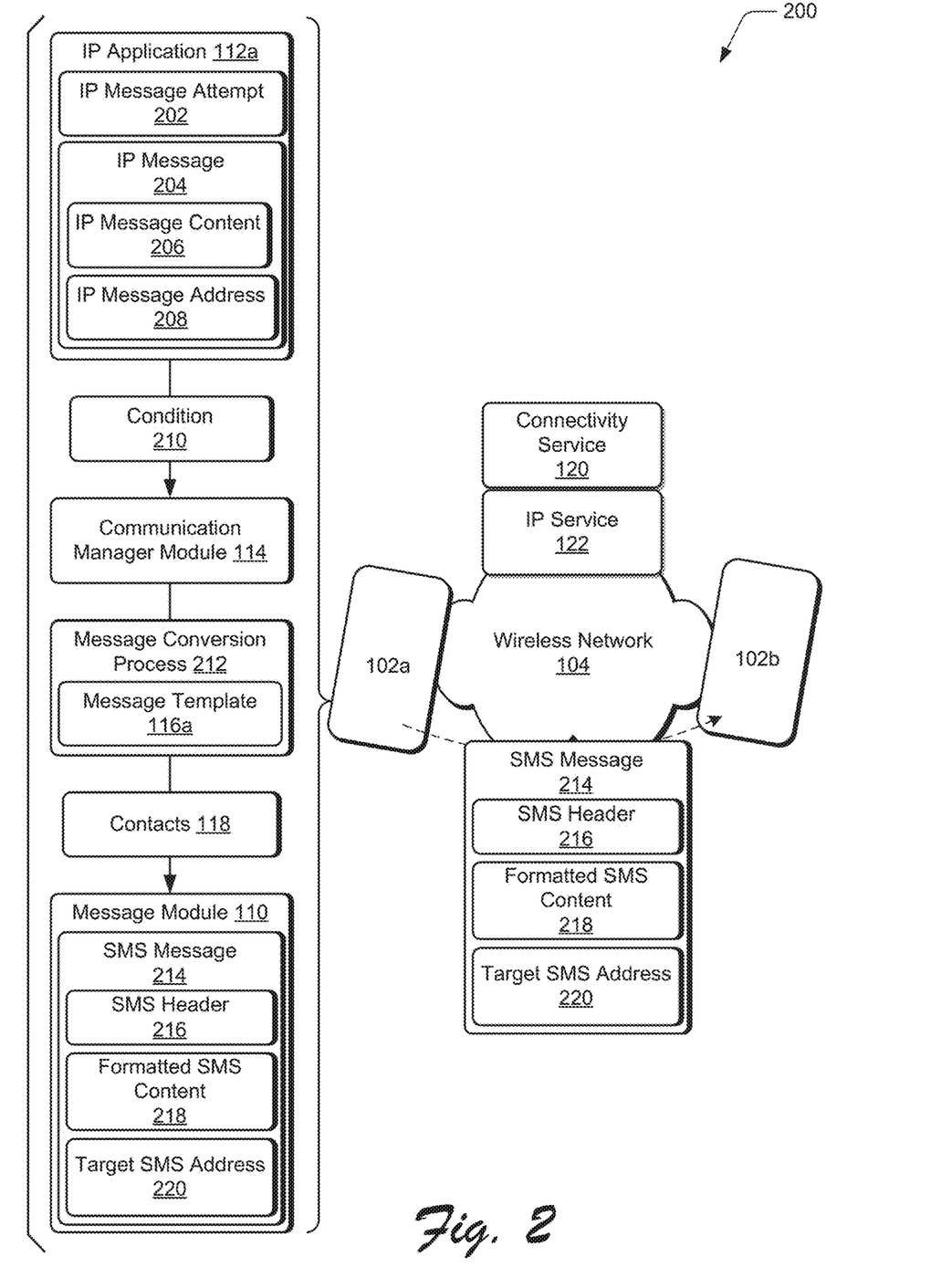
FIG. 2 depicts a system for implementing aspects of IP messages via SMS in accordance with one or more implementations.

FIG. 2 depicts a system 200 for implementing aspects of IP messages via SMS in accordance with one or more implementations. The system 200 may implement and/or be implemented in the context of the environment 100 and/or any other suitable environment.

In the system 200 an IP application 112a implements an IP message attempt 202 to attempt to send an IP message 204 that includes IP message content 206 and an IP message address 208. A user, for instance, interacts with the IP application 112a to generate the IP message 204 and to input the IP message content 206, such as to a GUI of the IP application 112a. Alternatively or additionally, the IP message attempt 202 can represent an automated process, such as implemented automatically by the IP application 112a in response to a particular messaging event. The IP message address 208 represents an address for a target device and/or target user for the IP message 204, such as an IP address, an email address, a contact name, and so forth, associated with the wireless device 102b.

In conjunction with the IP message attempt 202 a condition 210 occurs that causes the IP message attempt 202 to fail, e.g., an indication that the IP message 204 is not sendable by the wireless device 102a and/or is not receivable by the wireless device 102b. The IP message address 208, for instance, identifies the wireless device 102b as a target device (e.g., addressee) for the IP message. The communication manager module 114 detects that the condition 210 occurs and initiates a message conversion process 212 to convert the IP message 204 to an SMS message 214. Alternatively or additionally, the IP application 112a initiates and/or implements the message conversion process 212, and/or the message conversion process 212 is implemented cooperatively between the IP application 112a, the communication manager module 114, and/or the message module 110.

For instance, as part of the message conversion process 212, a message template 116a is selected that corresponds to the IP application 112a and the IP message content 206 is extracted from the IP message 204. The message template 116a can be utilized to generate the SMS message 214 to include at least some of the IP message content 206 and to format the SMS message 214 such that the SMS message 214 can be utilized by an instance of the IP application 112a.

Accordingly, utilizing the message conversion process 212 and the message template 116a, the SMS message 214 is generated based on the IP message 204 and the IP message content 206 to include an SMS header 216, formatted SMS content 218, and a target SMS address 220. The SMS header 216 includes various data (e.g., metadata) for the SMS message and in at least one implementation identifies an IP application associated with the SMS message 214. In this example, the SMS header 216 can include an identifier for the IP application 112a.

The formatted SMS content 218 includes at least some of the IP message content 206 and is in a form that can be understood (e.g., parsed) by an instance of the IP application 112a to reconstruct an IP message from the SMS message 214 that can be output by the IP application 112a. Alternatively or in addition the formatted SMS content 218 is in a form such that an instance of the message template 116a can be applied to the SMS message 214 to extract the formatted SMS content 218 and format the formatted SMS content 218 for output by an instance of the IP application 112a.

Further, the target SMS address 220 represents an address that is usable to route the SMS message 214 to a target device, e.g., the wireless device 102b. The target SMS address 220 can be implemented in various ways, such as a mobile phone number, a mobile equipment identifier (MEID), an international mobile equipment identity (IMEI), an email address, and so forth. The target SMS address 220, for instance, enables the SMS message 214 to be routed to a target device and/or target location, e.g., the wireless device 102b. In at least one implementation the communication manager module 114 converts the IP message address 208 to the target SMS address 220. For instance, the communication manager module 114 utilizes the contacts 118 to correlate the IP message address 208 to the corresponding target SMS address 220 for a target recipient (e.g., contact) and/or target device.

Further to the system 200, the message module 110 causes the SMS message 214 to be transmitted for receipt by the wireless device 102b, such as via a wireless cellular SMS transmission. The SMS message 214, for instance, is transmitted to a short message service center (SMSC) for forwarding to the wireless device 102b as identified by the target SMS address 220.

Figure 3:
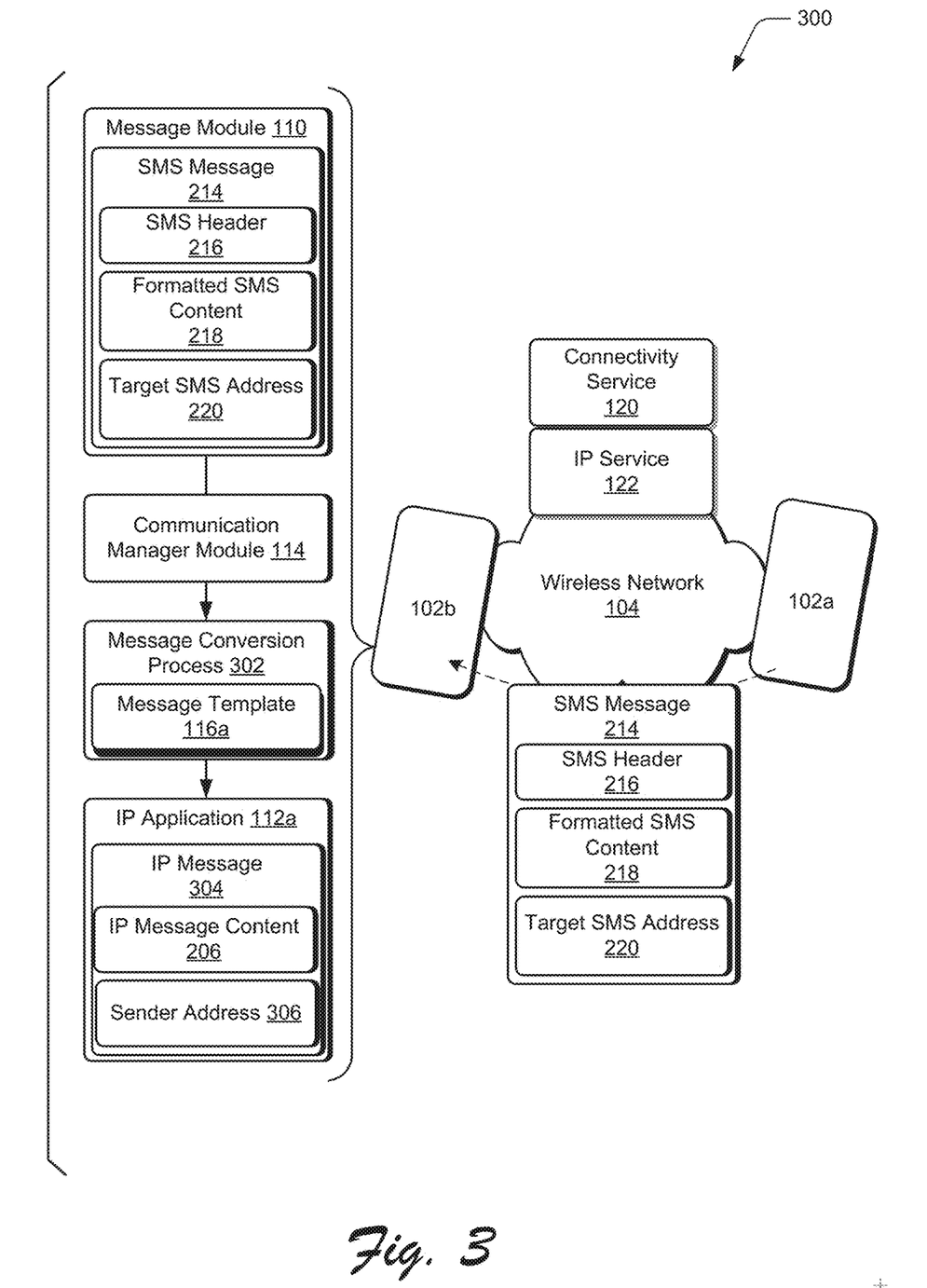
FIG. 3 depicts a system for implementing aspects of IP messages via SMS in accordance with one or more implementations.

FIG. 3 depicts a system 300 for implementing aspects of IP messages via SMS in accordance with one or more implementations. The system 300 may implement and/or be implemented in the context of the environment 100 and/or any other suitable environment. The system 300, for example, represents an extension and/or continuation of the system 200.

In the system 300 a message module 110 of the wireless device 102b receives the SMS message 214 with the SMS header 216 and the formatted SMS content 218. The communication manager module 114 detects the SMS message 214 with the SMS header 216 and the formatted SMS content 218 and initiates a message conversion process 302 to convert the SMS message 214 to an IP message 304. Alternatively or additionally, the IP application 112a initiates and/or implements the message conversion process 302, and/or the message conversion process 302 is implemented cooperatively between the IP application 112a, the communication manager module 114, and/or the message module 110. In at least one implementation the message conversion process 302 and the message conversion process 212 can be implemented utilizing different modules and/or data flows of a common set of computer-executable instructions for converting IP messages to SMS messages and for converting SMS messages to IP messages.

The message module 110 can determine based on the SMS header 216 that the SMS message 214 is associated with the IP application 112a and/or can be converted to an IP message. The SMS header 216, for instance, includes a tag and/or other identifier that indicates that the SMS message 214 is convertible to a corresponding IP message, and/or that identifies a particular instance of an IP application 112 to which the SMS message 214 is addressed, e.g. the IP application 112a. Thus, the message module 110 can notify the communication manager module 114 and/or the IP application 112a that the SMS message 214 is available to be converted to an IP message. Alternatively or additionally the communication manager module 114 and/or the IP application 112a can monitor incoming messages (e.g., SMS messages) and determine based on attributes of the SMS message 214 (e.g., the SMS header 216) that the SMS message 214 is associated with (e.g., addressed to) the IP application 112a.

Accordingly, the message conversion process 302 extracts the formatted SMS content 218 from the SMS message 214 and generates the IP message 304 to include the IP message content 206 based at least in part on the formatted SMS content 218. The message conversion process 302, for instance, utilizes the message template 116a to map the formatted SMS content 218 to the IP message content 206 for inclusion as part of the IP message 304. Accordingly, the IP application 112a can output the IP message 304 including the IP message content 206, such as in a GUI implemented by the IP application 112a.

Further, the IP message 304 includes sender address 306 that identifies an origin of the SMS message 214 and the IP message 304, e.g., the wireless device 102a and/or a user associated with the wireless device 102a. Thus, a user of the wireless device 102b can respond to the IP message 304 such as via interaction with the IP application 112a. For instance, the user of the wireless device 102b interacts with the IP application 112a to generate a further IP message that responds to the IP message 304. The further IP message can then be converted into a corresponding SMS message and transmitted to the wireless device 102a, such as described above in the system 200. The wireless device 102a can received the SMS message and convert the SMS message to a corresponding IP message, such as described in the system 300.

Figure 4:
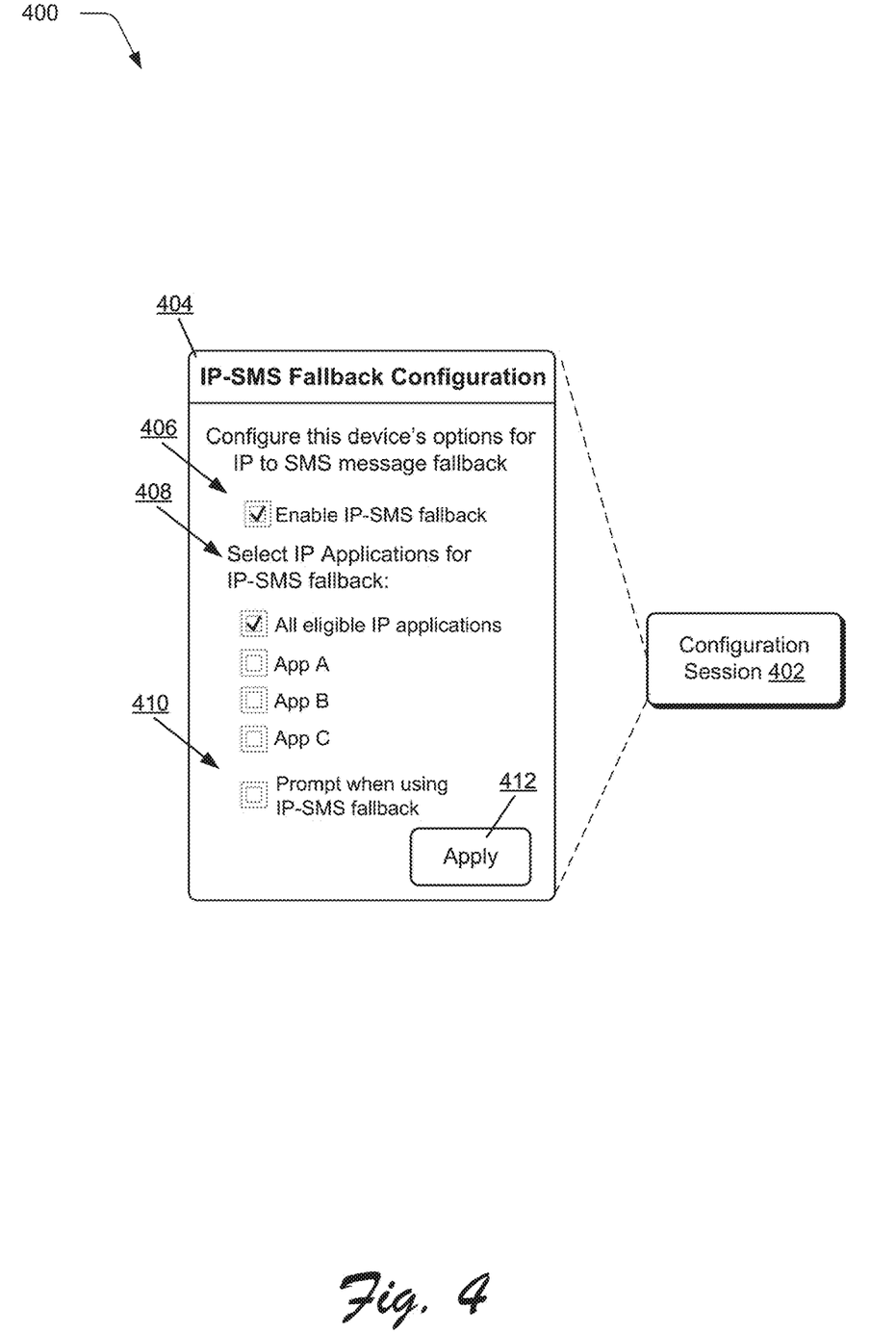
FIG. 4 depicts a system for configuring IP messages via SMS settings in accordance with one or more implementations.

FIG. 4 depicts a system 400 for configuring IP messages via SMS settings in accordance with one or more implementations. The system 400 may implement and/or be implemented in the context of the environment 100 and/or any other suitable environment. Further, the system 400 can be implemented in conjunction with the systems 200, 300.

In the system 400 a configuration session 402 is implemented, e.g., by the communication manager module 114. The configuration session 402, for instance, enables a user to configure different settings for IP messages via SMS. As part of the configuration session 402 a configuration graphical user interface (GUI) 404 is presented that includes different configurable IP messages via SMS settings. The configuration GUI 404, for instance, includes an enable IP-SMS field 406, an IP applications field 408, and a prompt field 410. The enable IP-SMS field 406 is selectable to enable and disable IP-SMS fallback logic on an associated device. For instance, default settings of a wireless device 102 automatically implement IP-SMS messaging fallback in response to detecting a condition that prevents sending and/or receiving an IP message, and the configuration session 402 enables a user to disable this default behavior.

The IP applications field 408 includes selectable options for applications for implementing IP messages via SMS behavior. The applications presented in the IP applications field 408, for example, represent instances of the IP applications 112. In this particular example the IP applications field 408 includes an "All eligible IP applications" option that is selectable to enable IP-SMS messaging fallback to be applied for eligible IP applications 112. For instance, some IP applications may be considered ineligible for IP-SMS fallback, such as based on message parameters that are incompatible with conversion to an SMS message, e.g., based on content type exceeding the capabilities of the SMS message constraints. Alternatively or additionally an entity associated with an IP application (e.g., an app developer, an IP app service, etc.) can opt the IP application out of the IP-SMS fallback behavior. Accordingly, when the "All eligible IP applications" option is selected, IP-SMS fallback can be applied for those IP applications that are expressly and/or implicitly identified as eligible for IP-SMS fallback. The IP applications field 408 also identifies individual instances of IP applications that are selectable to enable or disable IP-SMS fallback for the individual IP applications. In at least one implementation the IP applications field 408 only lists IP applications that are indicated as eligible for IP-SMS fallback behavior, e.g., those IP applications that have not been expressly or implicitly excluded from IP-SMS fallback. For instance, IP applications that are indicated as ineligible for IP messages to SMS behavior are filtered out (e.g., excluded from) the IP applications field 408.

The configuration GUI 404 also includes a prompt field 410 and an apply button 412. The prompt field 410 is selectable to cause a notification to be presented when IP-SMS fallback is attempted, such as a visual and/or audible notification. In at least one implementation, when IP-SMS fallback is attempted, a default setting causes the IP-SMS fallback to be initiated automatically and without presenting a notification that an IP-SMS fallback process is being implemented. Thus, the prompt field 410 is selectable to override this default setting and cause a notification of an IP-SMS fallback process to be presented. The apply button 412 is selectable to cause configuration settings from the configuration GUI 404 to be applied as part of the configuration session 402.

Figure 5:
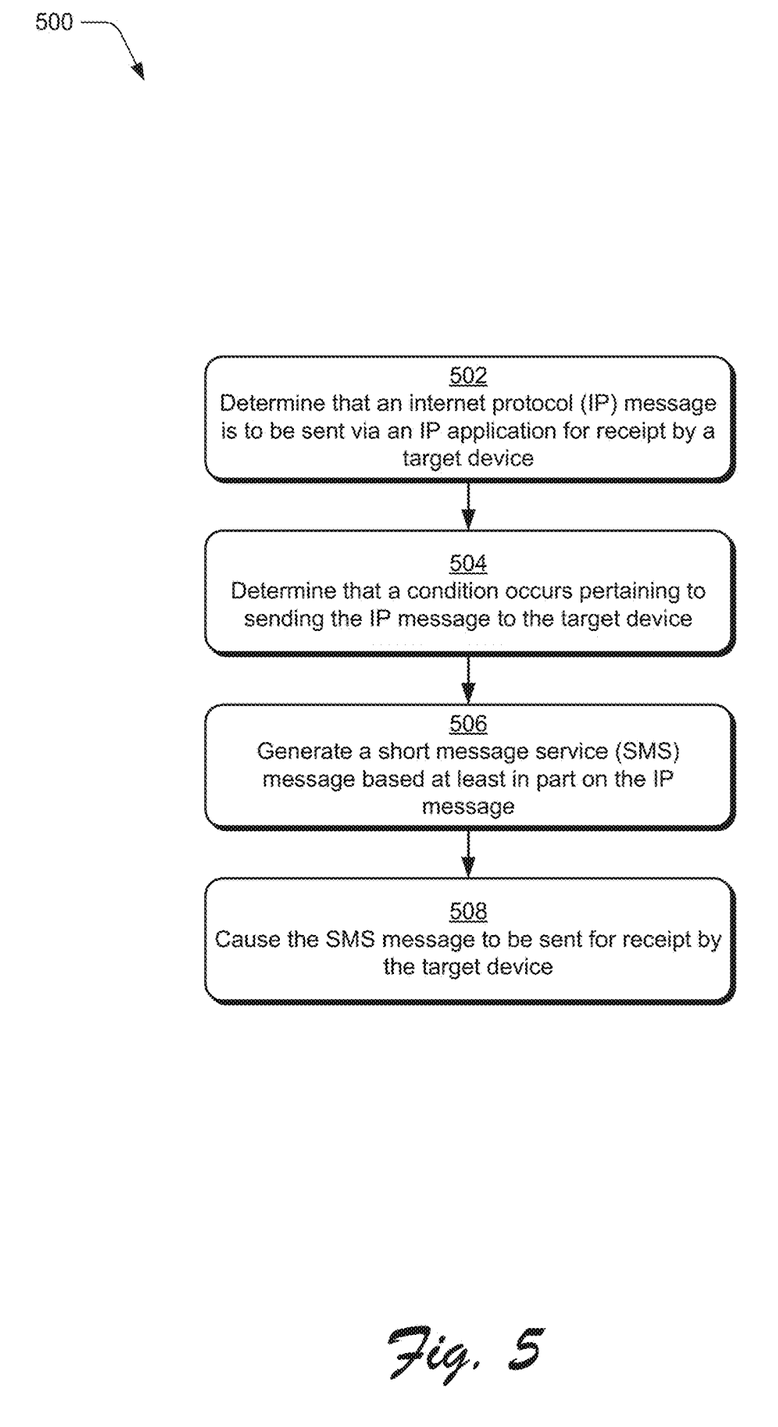
FIG. 5 depicts a method for implementing aspects of IP messages via SMS in accordance with one or more implementations.

FIG. 5 depicts a method 500 for implementing aspects of IP messages via SMS in accordance with one or more implementations. The method 500 may implement and/or be implemented by the environment 100 and/or any other suitable environment. At 502 it is determined that an IP message is to be sent via an IP application for receipt by a target device. A user, for instance, interacts with an IP application to generate an IP message to be sent to a target device. Alternatively or additionally, an IP application implements an automated process to generate an IP message to be sent to a target device, e.g., independent of user input.

At 504 it is determined that a condition occurs pertaining to sending the IP message to the target device. The condition, for instance, indicates that a sending device (e.g., the wireless device 102a) is not able to successfully send the IP message, and/or that the target device (e.g., the wireless device 102b) is not able to successfully receive the IP message. The condition can be caused by various factors, such as wireless signal at a sending and/or receiving device being below a signal threshold, a threshold signal strength, a threshold signal quality, a threshold signal bandwidth, etc. In at least one implementation the condition can be based on an available RAT at a sending device and/or a receiving device not supporting IP-based data communication. Alternatively or additionally the condition can indicate the data connectivity for an IP message is not available at a sending device and/or a receiving device.

At 506 an SMS message is generated based at least in part on the IP message. Various content from the IP message, for instance, is populated to an SMS message. For example, message content from the IP message is reformatted and/or encoded and populated to the SMS message. Further, information identifying attributes of the IP message can be included in the SMS message, such as an identifier for an IP application used to generate the IP message, an identifier for a message template 116 used to generate the SMS message, a target SMS address for the SMS message, and so forth. In at least one implementation an SMS header can be generated for the SMS message that includes various data and/or metadata for the SMS message.

At 508 the SMS message is caused to be sent for receipt by the target device. An IP address from the IP message, for instance, is converted into an SMS address for the SMS message and the SMS message is transmitted (e.g., for forwarding) to the SMS address.

Figure 6:
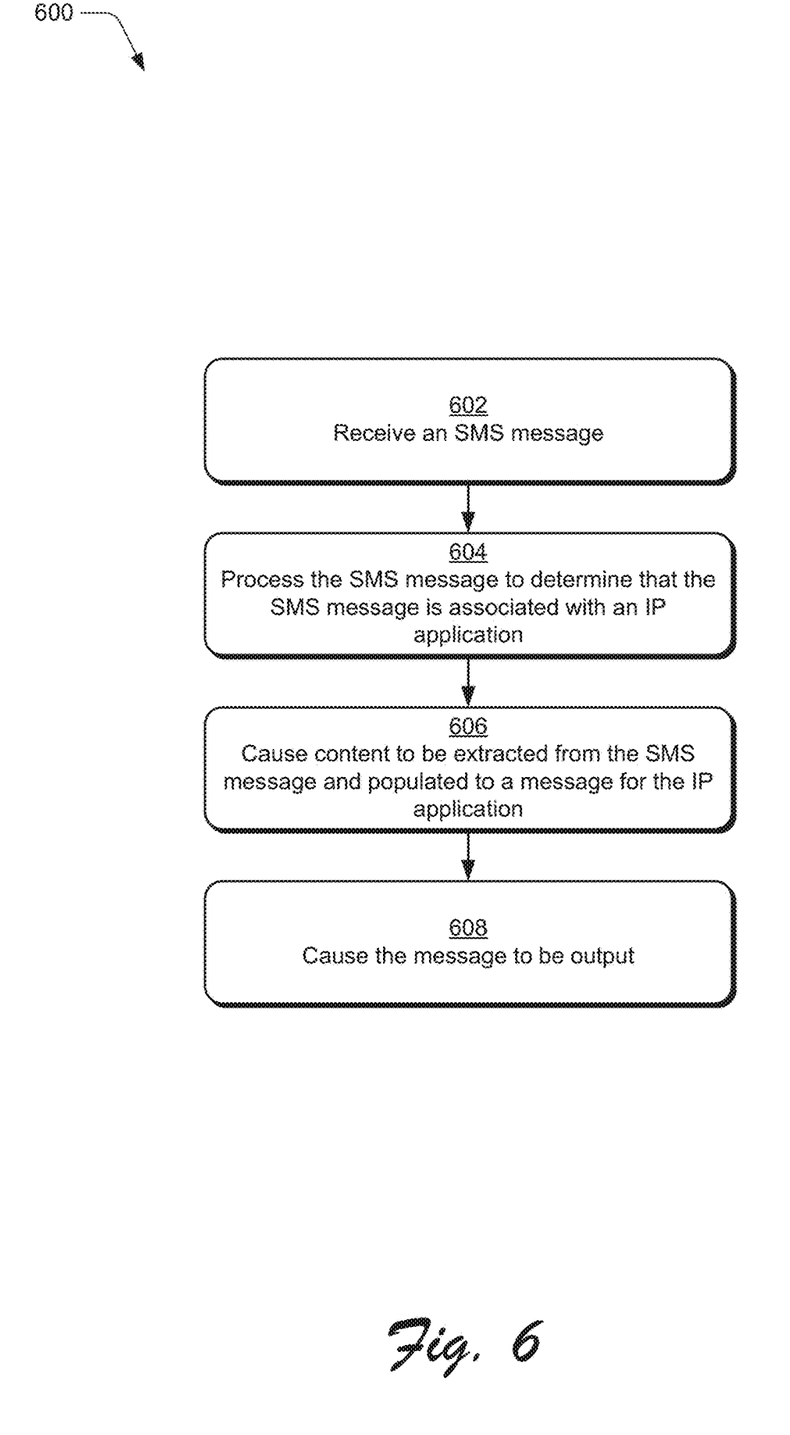
FIG. 6 depicts a method for implementing aspects of IP messages via SMS in accordance with one or more implementations.

FIG. 6 depicts a method 600 for implementing aspects of IP messages via SMS in accordance with one or more implementations. The method 600 may implement and/or be implemented by the environment 100 and/or any other suitable environment. Further, the method 600 may be implemented in conjunction with the method 500.

At 602 an SMS message is received. A wireless device, for instance, receives an SMS message. At 604 the SMS message is processed to determine that the SMS message is associated with an IP application. Data of the SMS message (e.g., data in a header and/or other data), for instance, indicates that the SMS message is associated with an IP application. In at least one implementation the SMS message can identify an IP application 112 associated with the SMS message and/or a message template 116 to be used to process the SMS message.

At 606 content is extracted from the SMS message and populated to a message for the IP application. The communication manager module 114 and/or the IP application, for instance, extracts message content from the SMS message and populates the content to a message in a format utilized by the IP application. In at least one implementation the message is generated as an IP message.

At 608 the message is caused to be output. The IP application, for instance, outputs the message, such as in a GUI of the IP application. Additionally or alternatively the message may be output in other forms such as audible output of content of the message. Further, while some implementations are discussed herein in the context of a communication-based message (e.g., a message with visual content such as text), it is to be appreciated that the described techniques can be utilized with a variety of different types of content associated with IP applications. For instance, the described techniques can be implemented to communicate message content that includes computer-readable code (e.g., executable code) that can be utilized by an IP application for various purposes, such as triggering functionality of an IP application.

Accordingly, techniques for IP messages via SMS are applicable to provide fallback behaviors for sending IP-originated messages when a condition that prevents sending an IP message occurs.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 7:
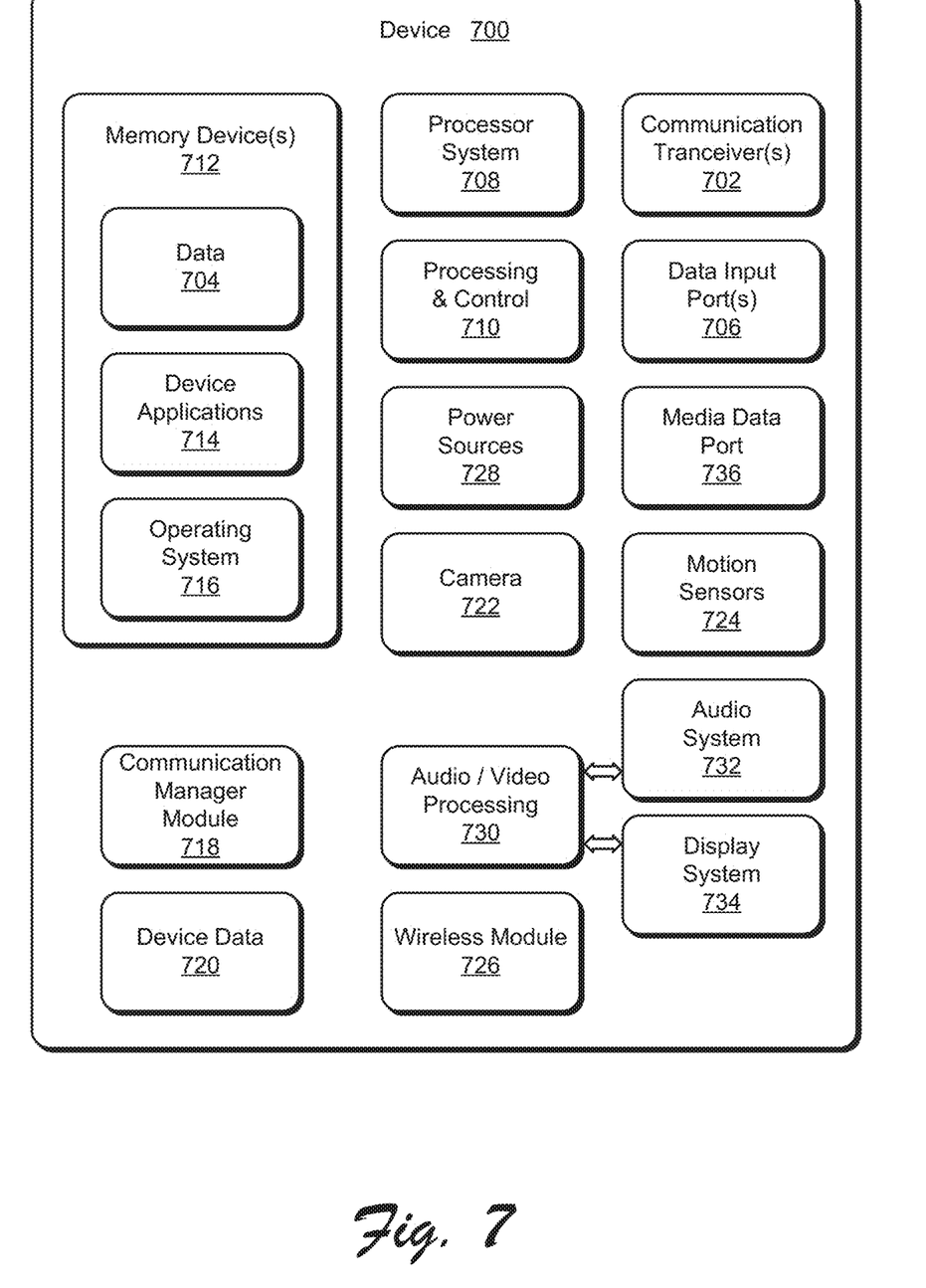
FIG. 7 illustrates various components of an example device in which aspects of IP messages via SMS can be implemented.

FIG. 7 illustrates various components of an example device 700 in which aspects of IP messages via SMS can be implemented. The example device 700 can be implemented as any of the devices described with reference to the previous FIGS. 1-7, such as any type of wireless device, mobile phone, mobile device, wearable device, tablet, computing, communication, entertainment, gaming, media playback, and/or other type of electronic device. For example, the wireless devices 102 as shown and described with reference to FIGS. 1-6 may be implemented as the example device 700.

The device 700 includes communication transceivers 702 that enable wired and/or wireless communication of data 704 with other devices. The data 704 can include any of device identifying data, device location data, wireless connectivity data, and wireless protocol data. Additionally, the data 704 can include any type of audio, video, and/or image data. Example communication transceivers 702 include wireless personal area network (WPAN) radios compliant with various IEEE 702.15 (Bluetooth™) standards, wireless local area network (WLAN) radios compliant with any of the various IEEE 702.11 (Wi-Fi™) standards, wireless wide area network (WWAN) radios for cellular phone communication, wireless metropolitan area network (WMAN) radios compliant with various IEEE 702.16 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processor system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory 712 (e.g., memory devices) that enable data storage, such as data storage devices that can be accessed by a computing device, and that provide persistent storage of data and executable instructions (e.g., software applications, programs, functions, and the like). Examples of the computer-readable storage memory 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory 712 provides data storage mechanisms to store the data 704, other types of information and/or data, and various device applications 714 (e.g., software applications). For example, an operating system 716 can be maintained as software instructions with a memory device and executed by the processing system 708. The device applications may also include a device manager, such as any form of a control application, software application, signal-processing and control module, code that is native to a particular device, a hardware abstraction layer for a particular device, and so on. Computer-readable storage memory 712 represents media and/or devices that enable persistent and/or non-transitory storage of information in contrast to mere signal transmission, carrier waves, or signals per se. Computer-readable storage memory 712 do not include signals per se or transitory signals.

In this example, the device 700 includes a connectivity module 718 that implements aspects of IP messages via SMS and may be implemented with hardware components and/or in software as one of the device applications 714, such as when the device 700 is implemented as a wireless device 102. As an example, the communication manager module 718 can be implemented as the communication manager module 114 described in detail above. In implementations, the communication manager module 718 may include independent processing, memory, and logic components as a computing and/or electronic device integrated with the device 700. The device 700 also includes communication data 720 for implementing aspects of IP messages via SMS and may include data from the communication manager module 718.

In this example, the example device 700 also includes a camera 722 and motion sensors 724, such as may be implemented in an inertial measurement unit (IMU). The motion sensors 724 can be implemented with various sensors, such as a gyroscope, an accelerometer, and/or other types of motion sensors to sense motion of the device. The various motion sensors 724 may also be implemented as components of an inertial measurement unit in the device.

The device 700 also includes a wireless module 726, which is representative of functionality to perform various wireless communication tasks. For instance, for a wireless device 700, the wireless module 726 can be leveraged to scan for and detect wireless networks, as well as negotiate wireless connectivity to wireless networks for a wireless device 700. The device 700 can also include one or more power sources 728, such as when the device is implemented as a wireless device. The power sources 728 may include a charging and/or power system, and can be implemented as a flexible strip battery, a rechargeable battery, a charged super-capacitor, and/or any other type of active or passive power source. Generally, utilizing implementations of IP messages via SMS enables the power sources 728 to be conserved as part of a wireless network connectivity process.

The device 700 also includes an audio and/or video processing system 730 that generates audio data for an audio system 732 and/or generates display data for a display system 734. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 736. In implementations, the audio system and/or the display system are integrated components of the example device. Alternatively, the audio system and/or the display system are external, peripheral components to the example device.

Figure 8:
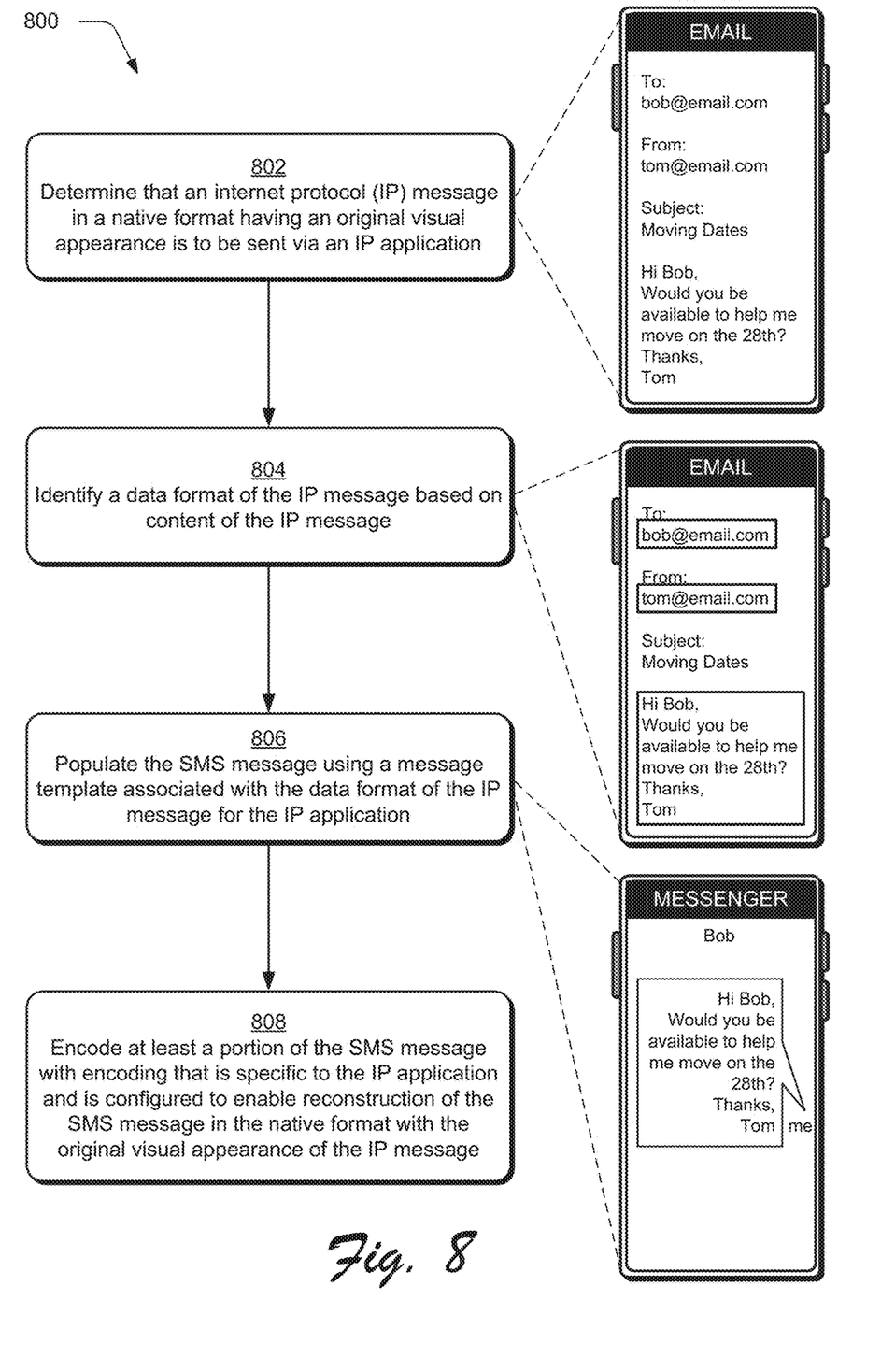
FIG. 8 depicts an example of implementing aspects of IP messages via SMS in accordance with one or more implementations.

Although implementations of IP messages via SMS have been described in language specific to features and/or methods, the subject of the appended claims is not necessarily limited to the specific features or methods described. Rather, the features and methods are disclosed as example implementations of IP messages via SMS, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

FIG. 8 depicts an example of implementing aspects of IP messages via SMS in accordance with one or more implementations.

At 802 an internet protocol (IP) message in a native format having an original visual appearance is determined to be sent via an IP application.

At 804 a data format of the IP message is identified based on content of the IP message.

At 806 an SMS message is populated using a message template associated with the data format of the IP message for the IP application.

At 808 at least a portion of the SMS message is encoded with encoding that is specific to the IP application and is configured to enable reconstruction of the SMS message in the native format with the original visual appearance of the IP message.

In some aspects, the techniques described herein relate to an apparatus including: a wireless module; and a communication manager module implemented to: determine that an internet protocol (IP) message is to be sent via an IP application for receipt by a target device; determine that a condition occurs indicating that that the IP message is not sendable; generate a short message service (SMS) message based at least in part on the IP message, including associating the SMS message with an identifier for the IP application; and cause the SMS message to be sent for receipt by the target device.

In some aspects, the techniques described herein relate to a apparatus, wherein the condition includes an indication that wireless signal at the apparatus is below a threshold.

In some aspects, the techniques described herein relate to a apparatus, wherein the threshold includes one or more of a threshold signal strength or a threshold signal quality.

In some aspects, the techniques described herein relate to a apparatus, wherein the condition includes an indication that data connectivity for the IP message is not available.

In some aspects, the techniques described herein relate to a apparatus, wherein to generate the SMS message includes to extract content from the IP message, populate the extracted content to the SMS message, and tag the SMS message with the identifier for the IP application.

In some aspects, the techniques described herein relate to a apparatus, wherein to generate the SMS message includes to encode at least a portion of the SMS message with encoding that is specific to the IP application.

In some aspects, the techniques described herein relate to a apparatus, wherein the apparatus includes an Internet of Things (IoT) device and wherein the target device includes a wireless device.

In some aspects, the techniques described herein relate to a apparatus, wherein the IP message includes an email, and wherein to generate the SMS message includes to convert at least a portion of the email into the SMS message.

In some aspects, the techniques described herein relate to a apparatus, wherein the communication manager module is further implemented to cause a notification to be output that indicates that the IP message is converted into the SMS message.

In some aspects, the techniques described herein relate to a apparatus, wherein the communication manager module is further implemented to: receive a further SMS message; process the further SMS message to determine that the further SMS message is associated with the IP application; and cause content to be extracted from the SMS message and populated to an IP message for the IP application.

In some aspects, the techniques described herein relate to an apparatus including: a wireless module; and a communication manager module implemented to: determine that an internet protocol (IP) message is to be sent via an IP application for receipt by a target device; determine that a condition occurs indicating that that the IP message is not receivable by the target device; generate a short message service (SMS) message based at least in part on the IP message, including associating the SMS message with an identifier for the IP application; and cause the SMS message to be sent for receipt by the target device.

In some aspects, the techniques described herein relate to a apparatus, wherein the condition includes an indication that wireless signal at the target device is below a threshold.

In some aspects, the techniques described herein relate to a apparatus, wherein the condition includes a notification from the IP application of a failure associated with an attempt to send the IP message to the target device.

In some aspects, the techniques described herein relate to a apparatus, wherein to generate the SMS message includes to extract content from the IP message, populate the extracted content to the SMS message, and tag the SMS message with the identifier for the IP application.

In some aspects, the techniques described herein relate to a apparatus, wherein to generate the SMS message includes to encode at least a portion of the SMS message with encoding that is specific to the IP application.

In some aspects, the techniques described herein relate to a apparatus, wherein the IP message includes an email, and wherein to generate the SMS message includes to convert at least a portion of the email into the SMS message.

In some aspects, the techniques described herein relate to a apparatus, wherein the communication manager module is further implemented to: receive a further SMS message; process the further SMS message to determine that the further SMS message is associated with the IP application; and cause content to be extracted from the SMS message and provided to the IP application.

In some aspects, the techniques described herein relate to a method including: determining that an internet protocol (IP) message is to be sent via an IP application from a first device for receipt by a second device; determining that a condition occurs indicating one or more of that that the IP message is not sendable by the first device or that the IP message is not receivable by the second device; generating a short message service (SMS) message based at least in part on the IP message, including associating the SMS message with an identifier for the IP application; and causing the SMS message to be sent for receipt by the second device.

In some aspects, the techniques described herein relate to a method, wherein the condition includes an indication that wireless signal at one or more of the first device or the second device is below a threshold.

In some aspects, the techniques described herein relate to a method, further including: receiving a further SMS message; processing the further SMS message to determine that the further SMS message is associated with the IP application; and causing content to be extracted from the SMS message and provided to the IP application.

The invention claimed is:

1. An apparatus comprising:
a wireless module; and
one or more processors coupled to the wireless module, the one or more processors configured to cause the apparatus to:
determine that an internet protocol (IP) message in a native format having an original visual appearance is to be sent via an IP application for receipt by a target device based on content of the IP message and an attempt to send the IP message;
determine that a condition occurs indicating that the IP message is not sendable;
generate a short message service (SMS) message by:
identifying a data format of the IP message based on content of the IP message;
populating the SMS message using a message template associated with the data format of the IP message for the IP application and based at least in part on:
contacts associated with the wireless module to correlate an IP message address to a corresponding target SMS address; and
the IP message, including associating the SMS message with a tag including an identifier that identifies, from multiple different IP applications, the IP application used to generate the IP message, the tag further including an indication that the SMS message is convertible into an IP message using the IP application; and
encoding at least a portion of the SMS message with encoding that is specific to the IP application and is configured to enable reconstruction of the SMS message in the native format with the original visual appearance of the IP message; and
cause the SMS message to be sent for receipt by the target device.

2. The apparatus of claim 1, wherein the condition comprises an indication that wireless signal at the apparatus is below a threshold.

3. The apparatus of claim 2, wherein the threshold comprises one or more of a threshold signal strength or a threshold signal quality.

4. The apparatus of claim 1, wherein the condition comprises an indication that data connectivity for the IP message is not available.

5. The apparatus of claim 1, wherein to generate the SMS message includes to extract content from the IP message, populate the extracted content to the SMS message, and tag the SMS message with the identifier for the IP application.

6. The apparatus of claim 1, wherein the apparatus comprises an Internet of Things (IoT) device and wherein the target device comprises a wireless device.

7. The apparatus of claim 1, wherein the IP message comprises an email, and wherein to generate the SMS message comprises to convert at least a portion of the email into the SMS message.

8. The apparatus of claim 1, wherein the wireless module is further implemented to cause a notification to be output that indicates that the IP message is converted into the SMS message.

9. The apparatus of claim 1, wherein the wireless module is further implemented to:
receive a further SMS message;
process the further SMS message to determine that the further SMS message is associated with the IP application; and
cause content to be extracted from the SMS message and populated to an IP message for the IP application.

10. The apparatus of claim 1, further comprising reconstructing the IP message from the SMS message using the native message format of the IP message extracted from the SMS message.

11. The apparatus of claim 10, wherein reconstructing the IP message includes reconstructing the original visual appearance of the IP message based on the native message format.

12. An apparatus comprising:
a wireless module; and
one or more processors coupled to the wireless module, the one or more processors configured to cause the apparatus to:
determine that an internet protocol (IP) message in a native format having an original visual appearance is to be sent via an IP application for receipt by a target device based on content of the IP message and an attempt to send the IP message;
determine that a condition occurs indicating that that the IP message is not receivable by the target device;
generate a short message service (SMS) message by:
identifying a data format of the IP message based on content of the IP message;
populating the SMS message using a message template associated with the data format of the IP message for the IP application and based at least in part on:
contacts associated with the wireless module to correlate an IP message address to a corresponding target SMS address; and
the IP message, including associating the SMS message with a tag including an identifier that identifies the IP application, from different IP applications, used to generate the IP message, and an indication that the SMS message is convertible into an IP message using the IP application; and encoding at least a portion of the SMS message with encoding that is specific to the IP application and is configured to enable reconstruction of the SMS message in the native format with the original visual appearance of the IP message; and cause the SMS message to be sent for receipt by the target device.

13. The apparatus of claim 12, wherein the condition comprises an indication that wireless signal at the target device is below a threshold.

14. The apparatus of claim 12, wherein the condition comprises a notification from the IP application of a failure associated with an attempt to send the IP message to the target device.

15. The apparatus of claim 12, wherein to generate the SMS message includes to extract content from the IP message, populate the extracted content to the SMS message, and tag the SMS message with the identifier for the IP application.

16. The apparatus of claim 12, wherein the IP message comprises an email, and wherein to generate the SMS message comprises to convert at least a portion of the email into the SMS message.

17. The apparatus of claim 12, wherein the wireless module is further implemented to:

receive a further SMS message;

process the further SMS message to determine that the further SMS message is associated with the IP application; and cause content to be extracted from the SMS message and provided to the IP application.

18. A method comprising:

determining that an internet protocol (IP) message in a native format having an original visual appearance is to be sent via an IP application from a first device for receipt by a second device based on content of the IP message and an attempt to send the IP message;

determining that a condition occurs indicating one or more of that that the IP message is not sendable by the first device or that the IP message is not receivable by the second device;

generating a short message service (SMS) message by:

identifying a data format of the IP message based on content of the IP message;

populating the SMS message using a message template associated with the data format of the IP message for the IP application and based at least in part on:

contacts associated with the first device to correlate an IP message address to a corresponding target SMS address; and the IP message, including associating the SMS message with a tag that includes:

an identifier for the IP application from multiple different IP applications; and an indication that the SMS message is convertible into an IP message using the IP application; and encoding at least a portion of the SMS message with encoding that is specific to the IP application and is configured to enable reconstruction of the SMS message in the native format with the original visual appearance of the IP message; and causing the SMS message to be sent for receipt by the second device.

19. The method of claim 18, wherein the condition comprises an indication that wireless signal at one or more of the first device or the second device is below a threshold.

20. The method of claim 18, further comprising:

receiving a further SMS message;

processing the further SMS message to determine that the further SMS message is associated with the IP application; and causing content to be extracted from the SMS message and provided to the IP application.

* * * * *